United States Patent

[11] 3,614,305

[72] Inventors Tsuneyoshi Hidaka
Tokyo;
Akiyoshi Morita, Yokohama; Yoshihiko Honjo, Yokohama; Takashi Nishimura, Yokohama, all of Japan

[21] Appl. No. 818,223
[22] Filed Apr. 22, 1969
[45] Patented Oct. 19, 1971
[73] Assignee Victor Company of Japan, Limited
Yokohama, Japan
[32] Priority Apr. 23, 1968, Apr. 23, 1968, Apr. 23, 1968
[33] Japan
[31] 43/26781, 43/26780 and 43/26779

[54] COLOR VIDEO SIGNAL CORRECTION FOR MECHANICAL VARIATIONS IN MAGNETIC RECORDING SYSTEM
6 Claims, 14 Drawing Figs.

[52] U.S. Cl. .......... 178/5.4 CD, 178/5.4 R, 179/100.2 K
[51] Int. Cl. .......... H04m 5/76
[50] Field of Search .......... 178/69.5 DC, 69.5 CB, 5.4 CD; 179/100.2 K, 100.2 MI

[56] References Cited

UNITED STATES PATENTS

| | | | |
|---|---|---|---|
| 3,506,777 | 4/1970 | Carlson .......... | 178/5.4 CR |
| 3,433,903 | 3/1969 | Murray et al. .......... | 179/100.2 MI |
| 3,018,324 | 1/1962 | Leyton .......... | 178/5.4 CR |

*Primary Examiner*—Robert L. Griffin
*Assistant Examiner*—Donald E. Stout
*Attorney*—Louis Bernat ABSTRACT: A color signal correction system for a video magnetic tape recorder removes differential frequency changes and differential phase shifts. The system comprises a trigger oscillator which oscillates in phase with a burst signal taken out of the color signal. A first means frequency modulates a color signal filtered out of the reproduced color video signal, and a second means frequency modulates the oscillation frequency of the oscillator. The output signals of the first and second frequency modulation means are mixed to produce a signal having the differential frequency removed therefrom. Control means is provided to control the natural resonant frequency of the tank circuit of the trigger oscillator, the control corresponding to the differential frequency changes and the differential phase shifts.

INVENTORS
TSUNEYOSHI HIDAKA
AKIYOSHI MORITA
YOSHIHIKO HONJO
TAKASHI NISHIMURA
BY
ATTORNEY

INVENTORS
TSUNEYOSHI HIDAKA
AKIYOSHI MORITA
YOSHIHIKO HONJO
TAKASHI NISHIMURA
BY
ATTORNEY

INVENTORS
TSUNEYOSHI HIDAKA
AKIYOSHI MORITA
YOSHIHIKO HONJO
TAKASHI NISHIMURA
BY Louis Bernat
ATTORNEY

INVENTORS
TSUNEYOSHI HIDAKA
AKIYOSHI MORITA
YOSHIHIKO HONJO
TAKASHI NISHIMURA

BY [signature]
ATTORNEY

INVENTORS
TSUNEYOSHI HIDAKA
AKIYOSHI MORITA
YOSHIHIKO HONJO
TAKASHI NISHIMURA

BY [signature]
ATTORNEY

INVENTORS
TSUNEYOSHI HIDAKA
AKIYOSHI MORITA
YOSHIHIKO HONJO
TAKASHI NISHIMURA
BY Louis Bernat
ATTORNEY

COLOR VIDEO SIGNAL CORRECTION FOR MECHANICAL VARIATIONS IN MAGNETIC RECORDING SYSTEM

This invention relates to a color video signal correction system and more particularly, to systems for removing frequency differential and phase differential errors from a color video signal, of an NTSC system, recorded on and reproduced video tape recorders.

In general, variations occur in rotation mechanisms and power transmission mechanisms of a color video tape recorder. For example, these variations manifest themselves as variations in the rate of the magnetic tape travel. As a result, a reproduced color video signal has differential frequency changes and differential phase shifts. These changes and shifts cause a change in the hue of a reproduced picture.

Many systems have heretofore been used to compensate for these differential changes and shifts. These prior art systems may be itemized as follows:

1. Direct Color Processing System

This type of system has a very narrow range of correction, and it necessitates the use of the so-called intersync and other similar devices. This makes the whole apparatus, including the video tape recorder, very complicated in construction and very large in size.

2. Line Sequential Color (LSC) System

This system necessitates a conversion between an NTSC signal and an LSC signal when color video signals are recorded on and reproduced from a color video tape recorder. This makes for complicated circuits.

3. Pilot System

This system relies on the insertion of a pilot signal when the color video signals are recorded. The use of a pilot signal deteriorates the reproduced color video signals.

4. Double Heterodyne System

In this system, the recording and playing back of color video signals are effected by using NTSC signals. They are used in their original form. However, an oscillator is locked to a burst signal to make a correction for each horizontal line scanning time. Therefore, it is impossible to completely remove differential frequency changes and differential phase shifts from the reproduced color video signals. More specifically, a burst signal is taken out of an input NTSC color signal and used to heterodyne and cause an oscillation in the same phase as said burst signal. Oscillation is sustained during one horizontal line scanning time. Therefore, it becomes difficult to maintain the oscillation in phase with the burst signal at every point of the horizontal line scanning time. If a change in speed increases, a phase error becomes quite pronounced. In other words, the phase of the color video signal changes gradually, with respect to the phase of the burst signal, at a ½, ⅔, ¾...horizontal line scanning time, thus causing a change in the hue of the reproduced image.

The present invention overcomes all the above described disadvantages of the prior art systems. In particular, it overcomes the disadvantages of the double heterodyne system.

Accordingly, an object of this invention is to provide a color video signal correction system which permits the correction of an NTSC color video signal reproduced from a color video tape recorder. Here, an object is to remove differential frequency changes including changes in a high-frequency range.

Another object of the invention is to provide a color video signal correction system which permits correction of an NTSC color video signal reproduced from a color video tape recorder. Here, an object is to completely remove differential phase shifts over a very wide range.

Another object of the invention is to provide a color video signal correction system which permits correction of an NTSC color video signal reproduced from a color video tape recorder. This system completely removes the differential frequency changes including the changes and differential phase errors in a high-frequency range. Thus, an object is to produce a stable reproduced signal with no change in hue.

Still another object of the invention is to provide a color video signal correction system which compensates for changes in an NTSC color video signal. In this connection, an object is to provide for slow motion and still motion playback without causing a change in hue.

A further object of the invention is to provide a color video signal correction system which can be used with a relatively simplified color video tape recorder having no capstan servosystem. Here, an object is to correct a color video signal so as to record and reproduce a color video signal without differential frequency changes and differential phase shifts.

Additional objects as well as features and advantages of the invention will become apparent from the description set forth hereinafter when considered in conjunction with the accompanying drawings, in which.

Figures 1, 2:
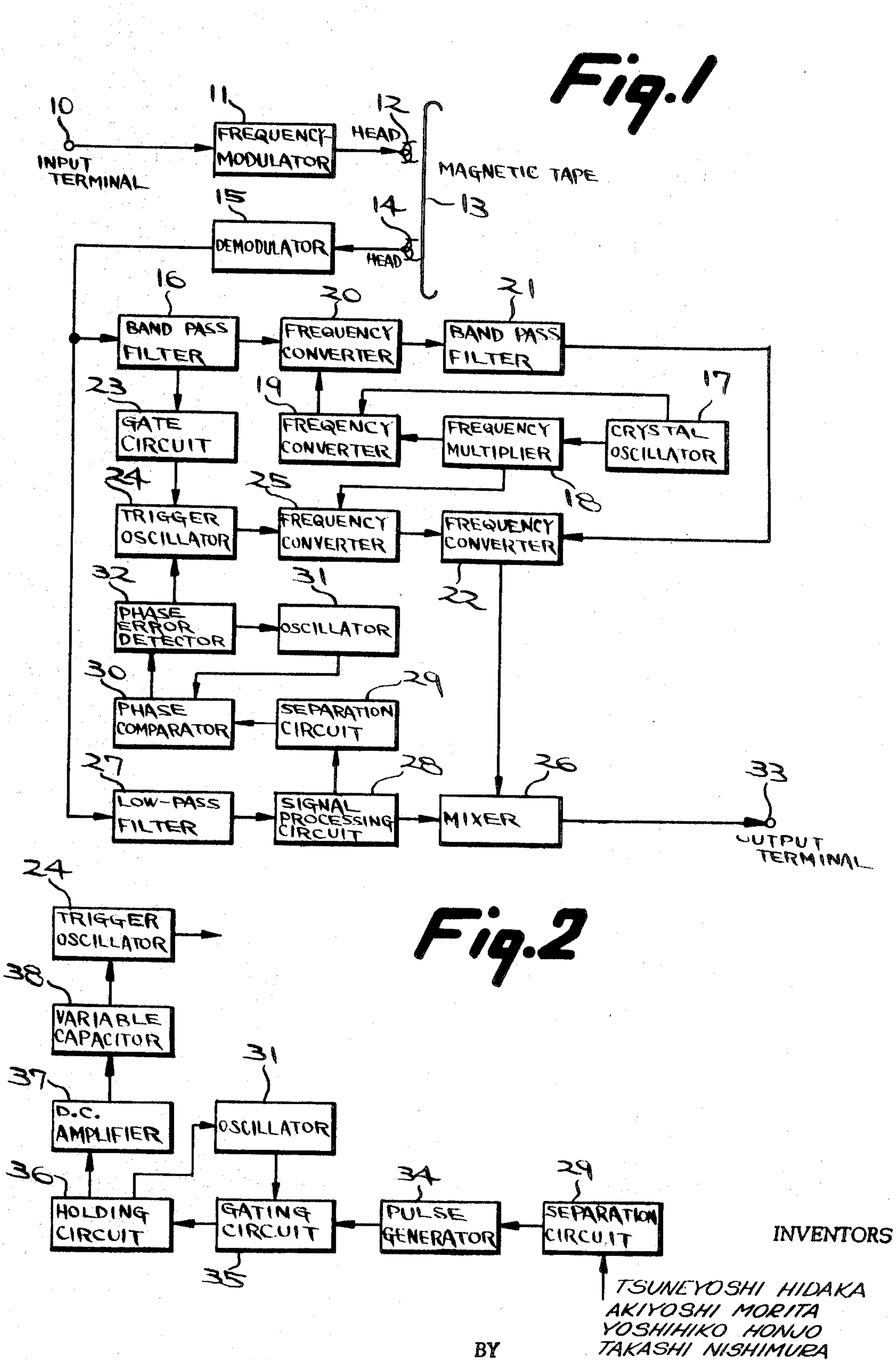
FIG. 1 is a block diagram of a first embodiment of the system according to this invention.
FIG. 2 is a block diagram of an essential subassembly portion of the embodiment shown in FIG. 1.

FIG. 1 shows a first embodiment of an inventive system for removing differential frequency changes. In FIG. 1, an NTSC color video signal is fed through an input terminal 10 to a frequency modulator 11. The resulting FM signal is recorded on a magnetic tape 13 by a magnetic recording head 12. The color video signal is played back or reproduced from the magnetic tape 13 by a magnetic reproducing head 14 connected to the input of a demodulator 15.

The reproduced color video signal is demodulated by the demodulator 15 and then fed into a band-pass filter 16, of 3.58 MHz. to filter out a color signal. The color signal, thus filtered out, has a frequency $F_1$ which is expressed by the formula:

$$F_1=(f\pm\Delta f\pm\delta f$$

where:

$f$=3.58 MHz., the subcarrier frequency and $\Delta f$ is a frequency band of the side band wave of the color signal, and $\pm\delta f$ is the differential frequency change occurring during the recording and playing back of the signal.

On the other hand, a frequency multiplier 18 multiplies the reference frequency of 3.58 MHz., produced by a crystal oscillator 17, $n$ times, to produce a frequency of 3.58$n$ MHz.

The output of the oscillator 17 has its reference frequency multiplied into 3.58 MHz. by the frequency multiplier 18. This multiplied frequency is combined with the signal of 3.58 MHz., supplied from the oscillator 17, by a frequency converter 19 to produce a signal having a frequency $mf$(=3.58 +3.58$n$) MHz. The color signal of the frequency $F_1$ is supplied from the band pass filter 16. The signal of the frequency $mf$ is supplied from the frequency converter 19 to a frequency converter 20 where it is converted into a signal of a frequency $F_2$. The frequency $F_2$ can be expressed by the formula $F_2=(f\pm\Delta f)\pm\partial f+mf$. The output signal of the frequency converter 20 is supplied through a band pass filter 21 to a frequency converter 22.

The output signal of the band-pass filter 16 is also supplied to a burst gate circuit 23 which takes out a burst signal from the output signal of the filter 16. This burst signal is fed into a trigger oscillator circuit 24 at the frequency of 3.58 MHz. The trigger oscillator is actuated by this burst signal, and it begins to oscillate in phase with the burst signal. This oscillation is sustained during one horizontal line scanning time. The output signal of the trigger oscillator 24 is a frequency $F_3$ which can be expressed by a formula $F_3$=3.58 MHz. ± $\delta f$. The frequency of the output signal of the oscillator 24 is frequency-converted in a frequency converter 25, responsive to a signal of 3.58*n* MHz. frequency supplied by the frequency multiplier 18. The resultant signal is a frequency $F_4$, which is then supplied to said frequency converter 22. The frequency $F_4$ can be expressed by the formula $F_4=mf\pm\delta f$.

A signal is taken out of the frequency converter 22 which represents the frequency difference between the signals $F_2$ and $F_4$, or $F_2-F_4=(f\pm\Delta f)\pm\partial f+mf-mf\mp\partial f=f\pm\Delta f$. The signal, from which the frequency differential $\partial f$ is removed, is supplied to a mixer 26.

However, minute differential phase errors may not be so removed, when there is a large frequency differential in the input burst signal. If the frequency of the burst signal is at great variance with the natural resonance frequency, 3.58 MHz. ($f$), of the trigger oscillator 24, the oscillation frequency which is locked to $f\pm\delta f$, gradually moves toward the natural resonance frequency. The error is maximized at the end of the horizontal synchronizing signal time.

Figures 5A, 5B, 5C, 5D, 5E, 5F, 5G, 5H:
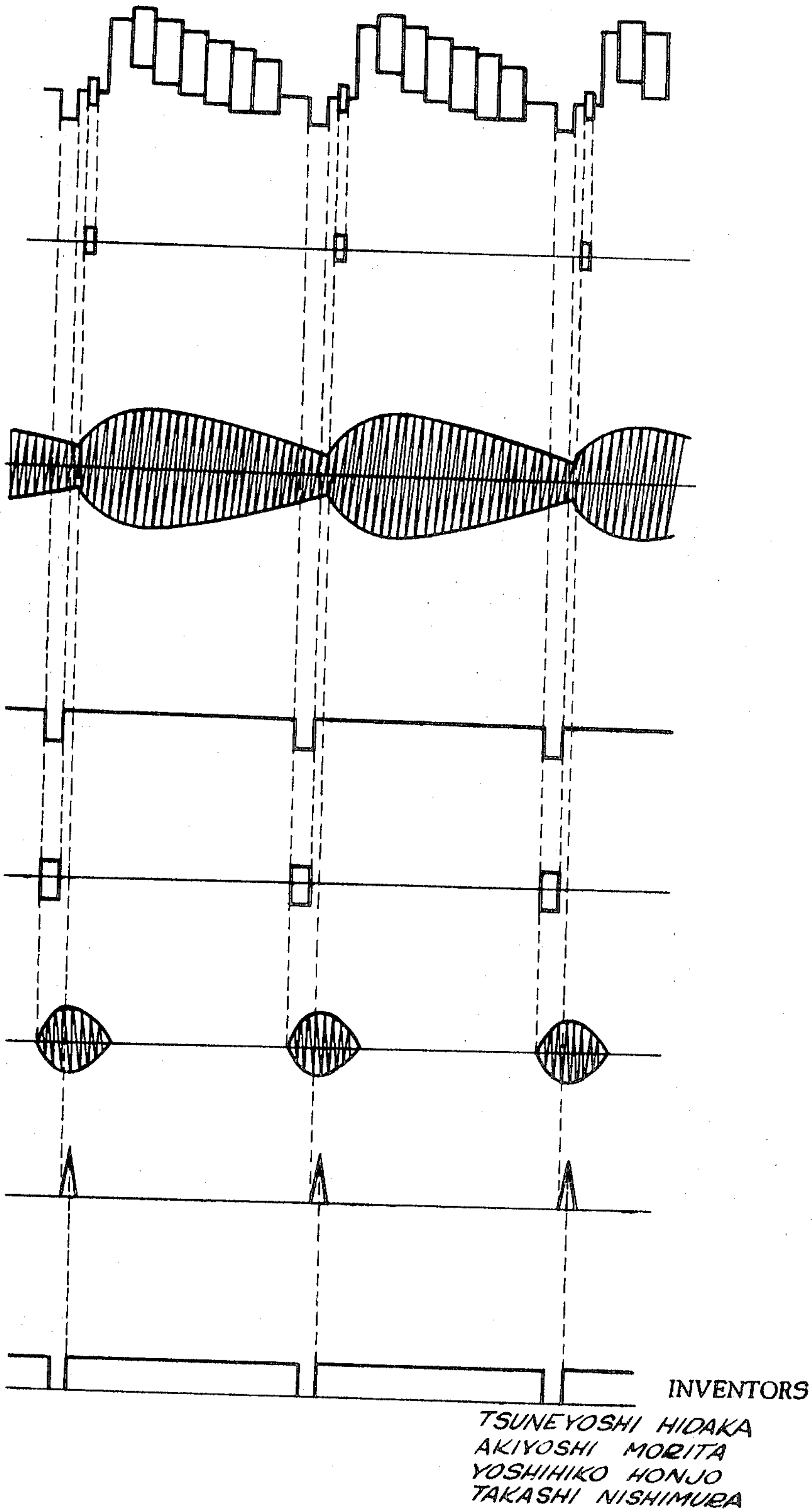
FIGS. 5A to 5H are graphs showing signals which appear at various points during the operation of a system constructed according to this invention.

FIG. 5 shows the signals going through these phases. More particularly, FIG. 5A shows a reproduced output signal of the video tape recorder. FIG. 5B shows a burst signal taken out of said reproduced output signal. FIG. 5C shows sustained oscillation of the trigger oscillator 24. The trigger oscillator continues to oscillate during a horizontal line scanning time, while it is gradually attenuated. Its phase is gradually modulated at the same time to shift toward the natural resonance frequency. This phase error is maximized immediately before the next following burst signal occurs or at the end of the horizontal synchronizing signal time.

If the phase error is produced, the burst signal component and the color signal component differ, from one another, in frequency. When the signals undergo such a frequency change, a change in hue occurs in the reproduced picture. Removal of the differential frequency change requires a control of the natural resonance frequency of the trigger oscillator, in conformity with a change in the value of $f\pm\delta f$.

In the embodiment of the invention described above, the correction removes a differential frequency change. The signal from the demodulator 15 is supplied to a low-pass filter 27, where a luminance signal is filtered out. The luminance signal so filtered out is supplied to a synchronizing signal processing circuit 28. The output of said processing circuit 28 is supplied to a mixer 26, and the other output of the circuit 28 is supplied to a horizontal synchronizing separation circuit 29. The horizontal synchronizing signal separated at the separation circuit 29 is supplied to a phase comparator 30 where its phase is compared with the phase of a 15.75 MHz. reference frequency from an oscillator 31. Then, the signal is supplied to a phase error detector 32. The oscillator 31 is controlled by the output of said phase error detector 32. The horizontal synchronizing separation circuit 29, phase comparator 30, reference frequency oscillator 31, and phase error detector 32 make up an AFC circuit.

By controlling the natural resonance frequency of the trigger oscillator 24 responsive to the output of the phase error detector 32 described hereafter in conjunction with FIG. 2, it is possible to bring the natural resonance frequency of the trigger oscillator into agreement with the frequency of the burst signal. This causes the frequency converter 22 to produce a stable color signal which has the differential frequency change completely removed therefrom, without causing any change in the hue of a reproduced image. The color signal supplied by the converter 22 and the luminance signal supplied by the synchronizing signal processing circuit 28 are mixed at the mixer 26. A stable NTSC color video signal, having its differential frequency change removed therefrom, taken out through an output terminal 33.

FIG. 2 shows the essential portions of the first embodiment of the invention just described. The horizontal synchronizing signal, separated by the horizontal synchronizing separation circuit 29, is supplied to a gating pulse generator 34. The gating pulse produced by this gating pulse generator 34 is supplied to a gating circuit 35. There, the gating pulse samples a part of the 15.75 MHz. sawtooth-shaped wave from a sawtooth-shaped wave oscillator 31. Since the reproduced signal from the magnetic tape 13 has a portion corresponding to a differential frequency change, the DC potential of the part which is so sampled also has a portion corresponding to the differential frequency change. The potential of the part which is sampled at the gating circuit 35 is held in a holding circuit 36 during a horizontal line scanning time, Then, it is amplified by a DC amplifier 37, and converted into an electrostatic capacity change of a variable capacitor 38 which forms one element of a tank circuit of the trigger oscillator 24. The resonance frequency of the trigger oscillator 24 is varied by an open loop circuit which consists of the gating pulse generator 34, the reference oscillator 31, the gating circuit 35, the holding circuit 36, the DC amplifier 37, the variable capacitor 38, and the trigger oscillator 24. This variance is in accordance with a change in the input of the oscillator 24. This corrects a large phase error. A part of the output of the holding circuit 36 is fed back to the oscillator 31.

Figure 3:
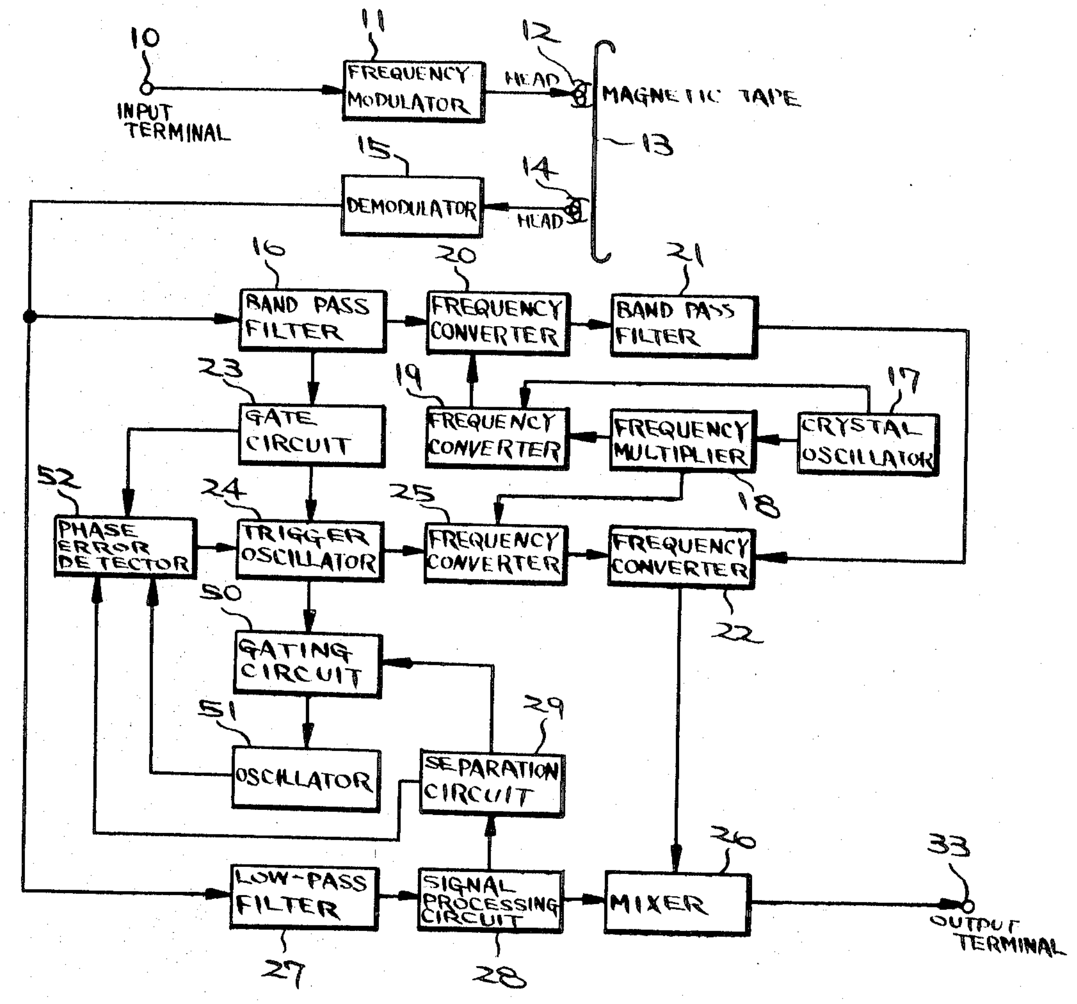
FIG. 3 is a block diagram of a second embodiment of the system according to this invention.

FIG. 3 shows a second embodiment or an embodiment of the phase correction system. The same reference characters designate similar parts in FIGS. 1 and 3, and description thereof is omitted at this point.

The output of the trigger oscillator 24 (FIG. 5C) is gated, as shown in FIG. 5E, at a gating circuit 50. The gate is controlled by a horizontal synchronizing signal, as shown in FIG. 5D. This signal is supplied by the horizontal synchronizing separation circuit 29. The gated signal from the output of the trigger oscillator 24 is used to sustain oscillation of a ringing oscillator 51, as shown in FIG. 5F. Then, the output signal (FIG. 5F) of the oscillator 51 is supplied to a phase error detector 52 which compares its phase, compared with the phase of a burst signal supplied from the burst gating circuit 23 as described hereafter in conjunction with FIG. 4.

FIG. 5G shows an output representing a detected error corresponding to a phase difference in the two signals. At the same time, a delayed pulse from the horizontal synchronizing signal is supplied from the separation circuit 29 to the detector 52 to effect the phase comparison only during the duration time of the burst signal. The output of the detector 52 is held during the horizontal line scanning time, as shown in FIG. 5H, and then it is fed back to the tank circuit of the trigger oscillator 24 as described in conjunction with FIG. 4. This completely removes a differential phase shift from the signal. The color signal from the frequency converter 22 and the luminance signal from the synchronizing signal processing circuit 28 are mixed at the mixer 26. A stable NTSC color video signal having its phase differential removed therefrom is taken out through the output terminal 33.

Figure 4:
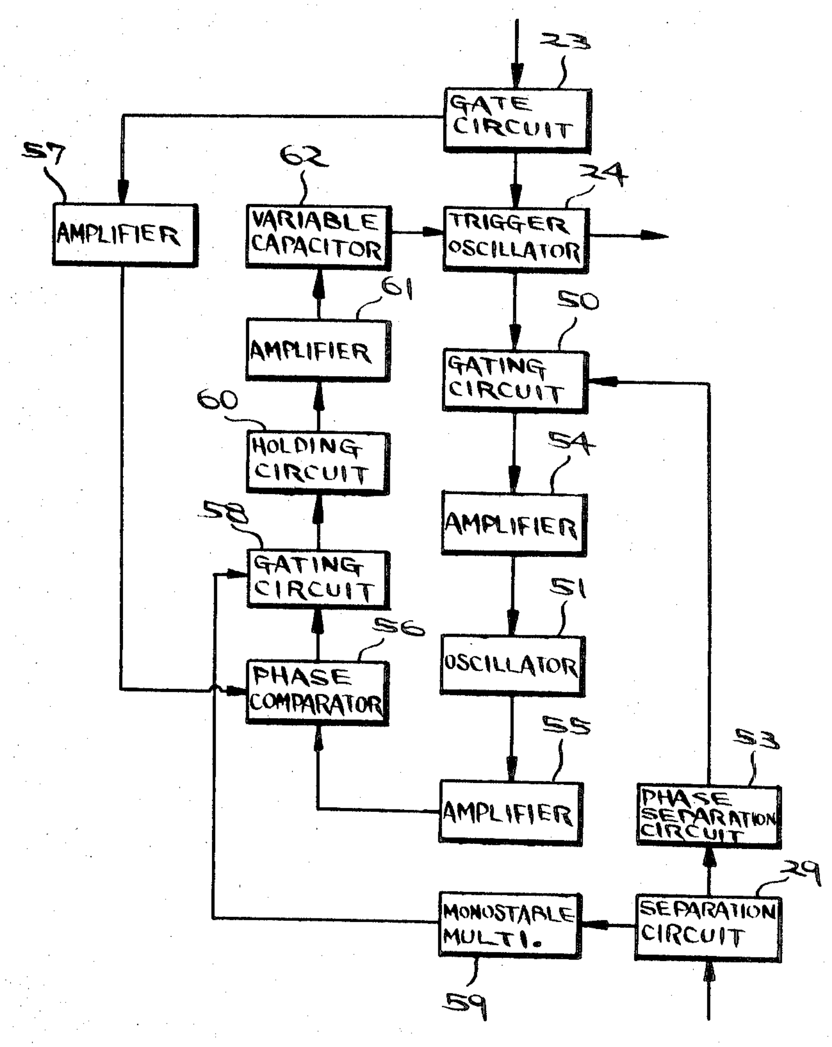
FIG. 4 is a block diagram of essential portions of the embodiment shown in FIG. 3.

FIG. 4 shows the essential portions of the second embodiment of the invention just described. The horizontal synchronizing separation circuit 29 supplies a horizontal synchronizing signal through a phase separation circuit 53 to the gating circuit 50. The gating circuit gates the output of the trigger oscillator 24 by the pulse from the phase separation circuit 53. The gated signal is shown in FIG. 5E. The gated signal is amplified by an amplifier 54 and supplied to excite the ringing oscillator, the oscillation of which is sustained, as shown in FIG. 5F.

The output of the oscillator 51 is supplied through an amplifier 55 to a phase comparator 56. At the same time, a burst signal is supplied from the burst gating circuit 23 through an amplifier 57 to the phase comparator 56. At the phase comparator 56, the phase of the output of the oscillator 51 is compared with the phase of the burst signal, and an output corresponding to the phase error is supplied to a gating circuit 58.

A monostable multivibrator 59 is supplied with a horizontal synchronizing signal derived from the horizontal synchronizing circuit 29 and generates a delayed pulse which substantially coincides with the burst signal in time. The delayed pulse is supplied to gating circuit 58 in which the output corresponding to the phase error is gated thereby during the duration time of the burst signal as shown in FIG. 5G. The output of the gating circuit 58 is held in a holding circuit 60 at the peak value of the wave-shape of the detected error during a horizontal line scanning time, as shown in FIG. 5H. The resulting signal is amplified by an amplifier 61, and supplied to a variable capacitor 62. The electrostatic capacity of the variable capacitor 62 is changed corresponding to the voltage level of the resulting signal. The variable capacitor forms one element of the tank circuit of the trigger oscillator 24. Thus, the natural resonance frequency of the oscillator 24 is controlled by a closed loop circuit with respect to the oscillator 24.

Figure 6:
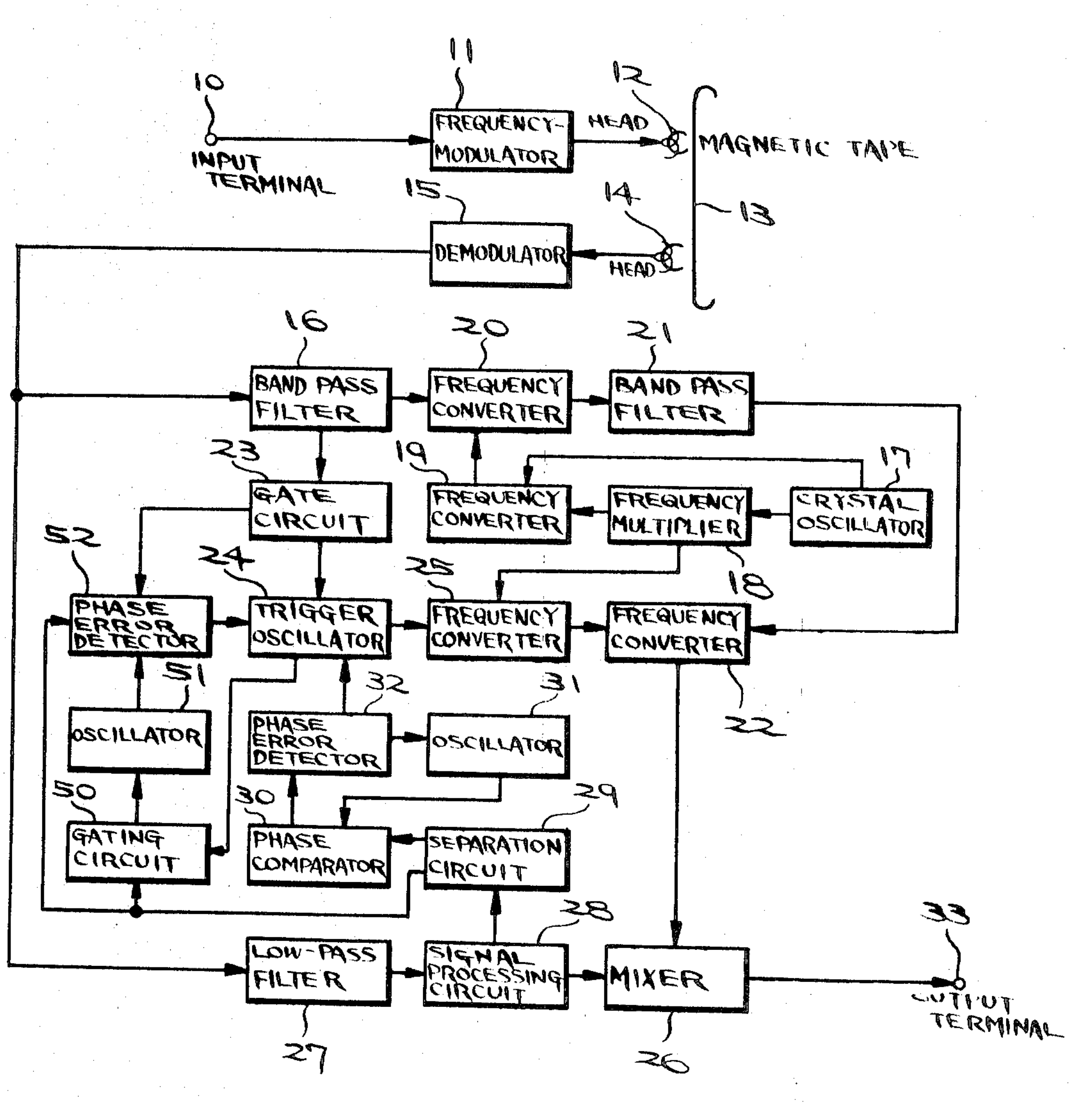
FIG. 6 is a block diagram of a third embodiment of the system according to this invention.

FIG. 6 shows a third embodiment of the present invention. Again, the same reference characters designate similar parts in FIGS. 1, 3 and 6 and description thereof is omitted at this point. In this embodiment, large phase errors are corrected by the color AFC circuit, which consists of the oscillator 31, the horizontal synchronizing signal separation circuit 29, the phase comparator 30, the phase error detector 32 and the trigger oscillator 24 and is open looped with respect to the trigger oscillator 24. Phase errors are completely corrected by the color error canceling circuit, which consists of the gating circuit 23, the trigger oscillator 24, the gating circuit 50, the ringing oscillator 51 and the phase error detector 52 and is close looped with respect to the trigger oscillator 24. Combined with the first and second embodiments, the third embodiment of the invention can provide a fully stable reproduced color video signal.

A horizontal synchronizing signal is separated by the horizontal synchronizing separation circuit 29. This signal is supplied to the phase comparator 30 of the color AFC circuit, which controls the trigger oscillator 24. At the same time, the horizontal synchronizing signal is supplied to the gating circuit 50 and phase error detector 52 of the color error canceller. The resonant frequency of the trigger oscillator 24 is controlled by the output of the phase error detector 32. At the same time, the output of the phase error detector 52 is fed back to the trigger oscillator 24 to further control the natural resonant frequency of the trigger oscillator 24.

Accordingly, the open loop correction circuit including the detector 32 makes it possible to cause the resonant frequency of the trigger oscillator 24 to conform to the frequency to the burst signal. Thus, a wide range of differential frequency changes can be removed from the reproduced color video signal, even in cases where the burst signal has a large differential frequency change. At the same time, the closed loop correction circuit including the detector 52 makes it possible to substantially eliminate a differential phase shift in a high-frequency range which cannot be removed by the open loop correction circuit.

Figure 7:
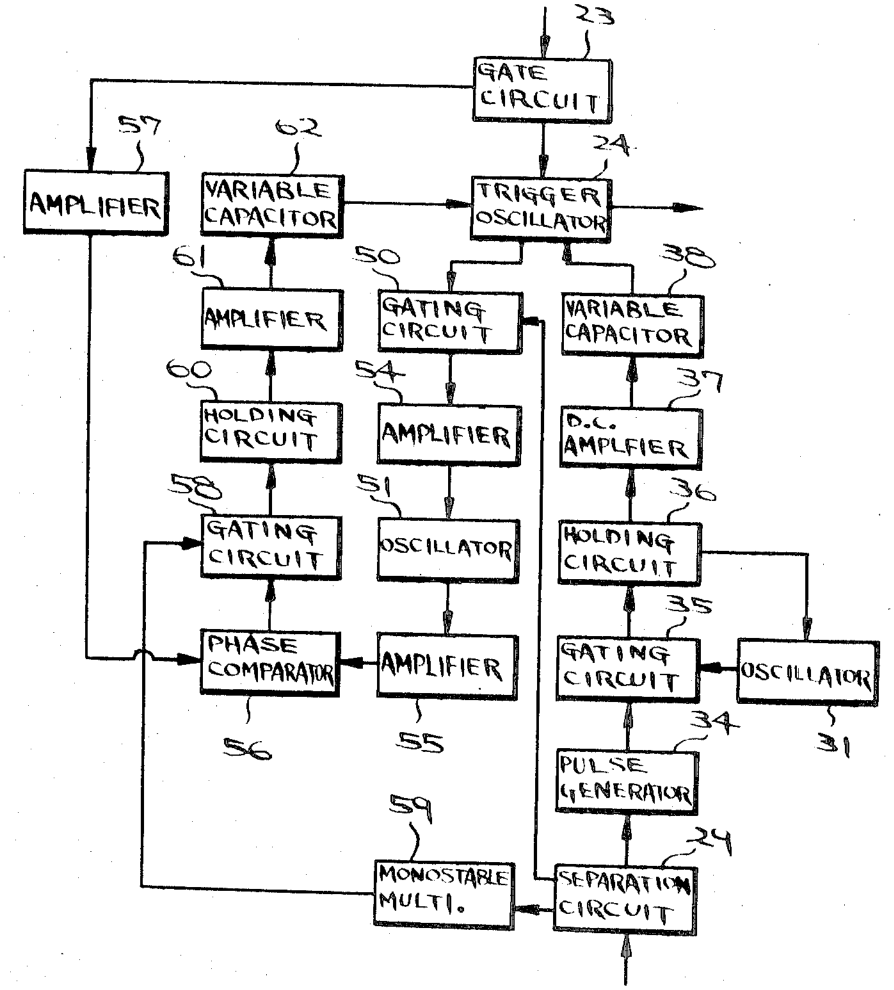
FIG. 7 is a block diagram of an essential subassembly portion of the embodiment shown in FIG. 6.

FIG. 7 shows the essential portions of the third embodiment just described. The block diagram shown in the figure represents a combination of the block diagrams shown in FIGS. 2 and 4. The same reference characters are used to designate similar parts in FIGS. 2, 4 and 7, and the description thereof is omitted.

In this embodiment, the trigger oscillator 24, which is actuated by a burst signal, is controlled by the open loop correction circuit. This loop circuit is controlled by the output of the color AFC circuit representing a phase error detected by comparing a horizontal synchronizing signal taken out of the reproduced signal with a reference frequency. This phase error corrects a large differential frequency change and differential phase shift. The trigger oscillator 24 is also controlled by the closed loop correction circuit. This closed loop circuit is controlled by the output of the phase error detector, representing a phase error which is detected by comparing the output of the trigger oscillator and a burst signal obtained from the reproduced signal. This output comparison corrects a phase error in a high-frequency range. By virtue of the present invention, it is possible to correct an NTSC color video signal reproduced from a color video tape recorder and to remove substantially all of the differential phase errors in a higher frequency range. Thus, it is possible to produce a stable reproduced signal with no change in hue.

It should be understood that the appended claims are intended to cover all equivalents falling within the true scope and spirit of the invention.

What we claim is:

1. A color video signal correction system comprising first filter means for filtering out a color signal from a color video signal, first frequency converter means responsive to a first predetermined frequency for changing the frequency of the color signal supplied by said first filter means, gating means for taking out a burst signal from said color signal, trigger oscillator circuit means having a tank circuit and being actuated by said burst signal, second frequency converter means responsive to a second predetermined frequency for changing the frequency of the output of said trigger oscillator, third frequency converter means for mixing the outputs of said first and second frequency converter means to produce a color signal with a frequency differential removed therefrom, second filter means for filtering out a luminance signal from the color video signal, means for mixing said luminance signal and said color signal produced by said third frequency converter means, means for separating a horizontal synchronizing signal from said luminance signal, means for producing a reference signal, phase comparing means for comparing the phase of said horizontal synchronizing signal and the phase of said reference signal, means responsive to the output of said phase comparing means for controlling the oscillation frequency of said reference signal producing means, and means responsive to the output of said phase comparing means for controlling the natural resonant frequency of the tank circuit of the trigger oscillator circuit means.

2. A color video signal correction system comprising first filter means for filtering out a color signal from a color video signal, first frequency converter means responsive to a first predetermined frequency for changing the frequency of the color signal supplied by said first filter means, first gating means for taking out a burst signal from said color signal, a trigger oscillator circuit means having a tank circuit for setting a natural resonant frequency and being actuated by said burst signal, second frequency converter means responsive to a second predetermined frequency for changing the frequency of the output of said trigger oscillator circuit means, third frequency converter means for mixing the outputs of said first and second frequency converter means to produce a color signal with a frequency differential removed therefrom. second filter means for filtering out a luminance signal from the color video signal, means for mixing said luminance signal and said color signal produced by said third frequency converter means, means for separating a horizontal synchronizing signal from said luminance signal, means responsive to said horizontal synchronizing signal for producing a gating pulse, means for producing a reference signal having a given oscillation frequency, second gating means for gating the reference signal responsive to said gating pulse, signal holding circuit means for holding the output of said second gating means during one horizontal line scanning period, means responsive to the output of said signal holding circuit means for controlling the given oscillation frequency of said reference signal producing means, DC amplifier means for amplifying the output of said signal holding circuit means, a variable capacitor forming one element of the tank circuit of the trigger oscillator circuit means, and means responsive to the output of said DC amplifier means for changing the electrostatic capacity of said variable capacitor to control the natural resonant frequency of the tank circuit of the trigger oscillator circuit means.

3. A color video signal correction system comprising first filter means for filtering out a color signal from a color video signal, first frequency converter means responsive to a first predetermined frequency for changing the frequency of the color signal supplied by said first filter means, first gating means for taking out a burst signal from said color signal, a trigger oscillator circuit means having a tank circuit for setting an output frequency and being actuated responsive to said burst signal, second frequency converter means responsive to a second predetermined frequency for changing the frequency of the output of said trigger oscillator circuit means, third frequency converter means for mixing the outputs of said first and second frequency converter means to produce a color signal with a frequency differential removed therefrom, second filter means for filtering out a luminance signal from the color video signal, means for mixing said luminance signal and said color signal produced by said third frequency converter means, means for separating a horizontal synchronizing signal from said luminance signal, second gating means responsive to said horizontal synchronizing signal for gating the output of said trigger oscillator circuit means, ringing oscillator means actuated responsive to the output of said second gating means, phase error detection means for comparing the phase of the burst signal taken out from said first gating means with the phase of the output of said ringing oscillator means and generating an output signal corresponding to the phase difference between the burst signal and the output of said ringing oscillator, and means responsive to the output of said error detection means for controlling the naturally occurring output resonant frequency of the tank circuit of the trigger oscillator circuit means.

4. A color video signal correction system comprising first filter means for filtering out a color signal from a color video signal, first frequency converter means responsive to a first predetermined frequency for changing the frequency of the color signal supplied by said first filter means, first gating means for taking out a burst signal from said color signal, a trigger oscillator circuit means having a tank circuit having a naturally occurring resonant frequency and being actuated responsive to said burst signal, second frequency converter means responsive to a second predetermined frequency for changing the frequency of the output of said trigger oscillator circuit means, third frequency converter means for mixing the outputs of said first and second frequency converter means to produce a color signal with a frequency differential removed therefrom, second filter means for filtering out a luminance signal from the color video signal, means for mixing said luminance signal and said color signal produced by said third frequency converter means, means for separating a horizontal synchronizing signal from said luminance signal, second gating means responsive to said horizontal synchronizing signal for gating the output of said trigger oscillator circuit means, ringing oscillator means actuated responsive to the output of said second gating means, phase comparing means for comparing the phase of the output of said ringing oscillator means and the phase of said burst signal taken out by said first gating means, means responsive to the horizontal synchronizing signal for generating a delayed pulse which occurs substantially in coincidence with the occurrence of said burst signal, third gating means responsive to said delayed pulse for gating the output of said phase comparing means, holding circuit means for holding the output of said third gating means during one horizontal line scanning time, a variable capacitor forming one element of the tank circuit of the trigger oscillator circuit means, and means responsive to the output of said holding circuit means for changing the electrostatic capacity of said variable capacitor to control the natural resonant frequency of the tank circuit of the trigger oscillator circuit means.

5. A color video signal correction system comprising first filter means for filtering out a color signal from a color video signal, first frequency converter means responsive to a first predetermined frequency for changing the frequency of the color signal supplied by said first filter means, first gating means for taking out a burst signal from said color signal, trigger oscillator means having a tank circuit for setting a naturally occurring resonant frequency actuated by said burst signal, second frequency converter means responsive to a second predetermined frequency for changing the frequency of the output of said trigger oscillator means, third frequency converter means for mixing the outputs of said first and second frequency converter means to produce a color signal with a frequency differential removed therefrom, second filter means for filtering out a luminance signal from the color video signal, means for mixing said luminance signal and said color signal produced by said third frequency converter means, means for separating a horizontal synchronizing signal from said luminance signal, means for producing a reference signal, first phase comparing means for comparing the phase of said horizontal synchronizing signal and the phase of said reference signal, means responsive to the output of said first phase comparing means for controlling the oscillation frequency of said reference signal producing means, first means responsive to the output of said first phase comparing means for controlling the natural resonant frequency of the tank circuit of the trigger oscillator means, second gating means responsive to said horizontal synchronizing signal for gating the output of said trigger oscillator means, ringing oscillator means actuated by the output of said second gating means, phase error detection means for comparing the phase of the burst signal taken out from said first gating means with the phase of the output of said ringing oscillator means and generating an output signal corresponding to the phase difference between the burst signal and the output of said ringing oscillator means, and second means responsive to the output of said error detection means for controlling the natural resonant frequency of the tank circuit of the trigger oscillator means.

6. A color video signal correction system comprising first filter means for filtering out a color signal from a color video signal, first frequency converter means responsive to a first predetermined frequency for changing the frequency of the color signal supplied by said first filter means, first gating means for taking out a burst signal from said color signal, a trigger oscillator means having a tank circuit for setting a resonant frequency actuated by said burst signal, second frequency converter means responsive to a second predetermined frequency for changing the frequency of the output of said trigger oscillator means, third frequency converter means for mixing the outputs of said first and second frequency converter means to produce a color signal with a frequency differential removed therefrom, second filter means for filtering out a luminance signal and said color video signal, means for mixing said luminance signal and said color signal produced by said third frequency converter means, means for separating a horizontal synchronizing signal from said luminance signal, means responsive to said horizontal synchronizing signal for producing a gating pulse, means for producing a reference signal, second gating means for gating the reference signal by said gating pulse, first signal holding circuit means for holding the output of said second gating means during one horizontal line scanning period, means responsive to the output of said first signal holding circuit means for controlling the oscillation frequency of said reference signal producing means, a first variable capacitor forming one element of the tank circuit of the trigger oscillator means, means responsive to the output of said first signal holding circuit means for changing the electrostatic capacity of said first variable capacitor to control the natural resonant frequency of the tank circuit of said trigger oscillator means, third gating means responsive to said gating pulse for gating the output of said trigger oscillator means, ringing oscillator means actuated by the output of said third gating means, phase comparing means for comparing the phase of the output of said ringing oscillator means and the phase of said burst signal taken out by said first gating means, means responsive to the horizontal synchronizing signal for generating a delayed pulse which occurs substantially in coincidence with the occurrence of said burst signal, fourth gating means responsive to said delayed pulse for gating the output of said phase comparing means, second holding circuit means for holding the output of said fourth gating means during one horizontal line scanning period, a second variable capacitor forming another element of the tank circuit of said trigger oscillator means, and means responsive to the output of said second holding circuit means for changing the electrostatic capacity of said second variable capacitor to control the natural resonant frequency of the tank circuit of said trigger oscillator means.